June 9, 1936. W. D. MOORE 2,043,858
PROTECTOR COVER FOR TRUCKS
Filed Feb. 28, 1935 2 Sheets-Sheet 1

Inventor
Walter D. Moore,
By Church & Church
His Attorneys

June 9, 1936.     W. D. MOORE     2,043,858
PROTECTOR COVER FOR TRUCKS
Filed Feb. 28, 1935     2 Sheets-Sheet 2
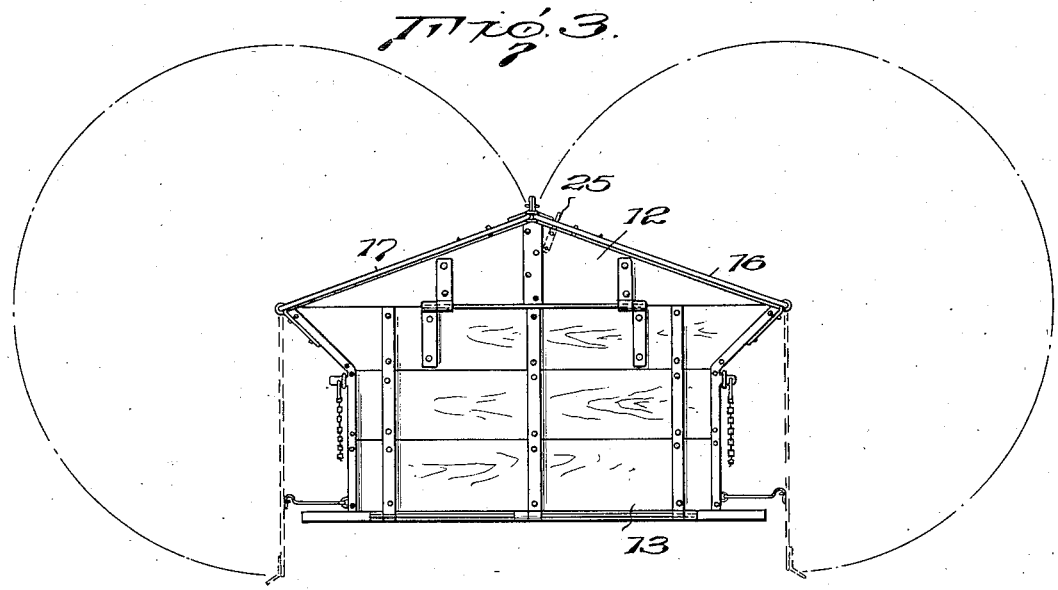
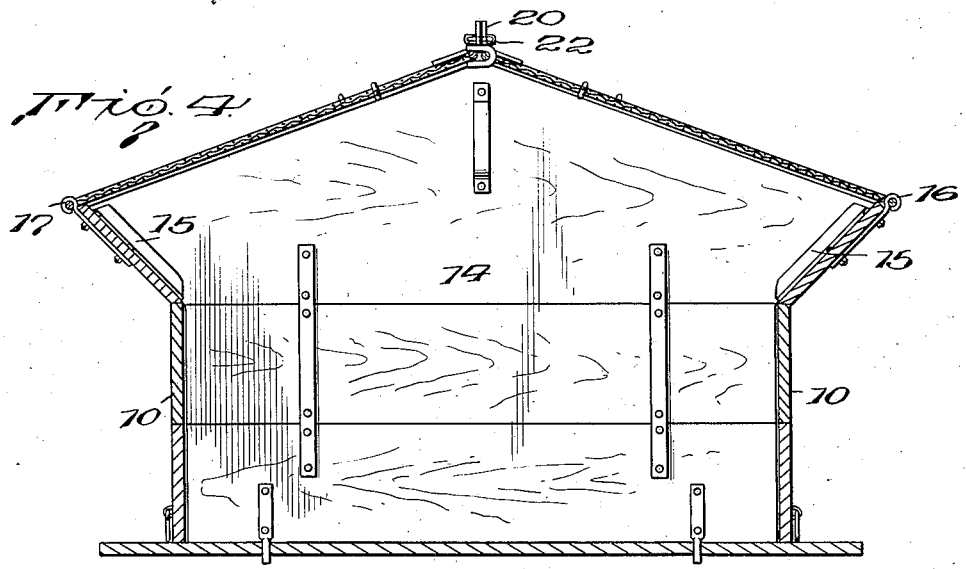
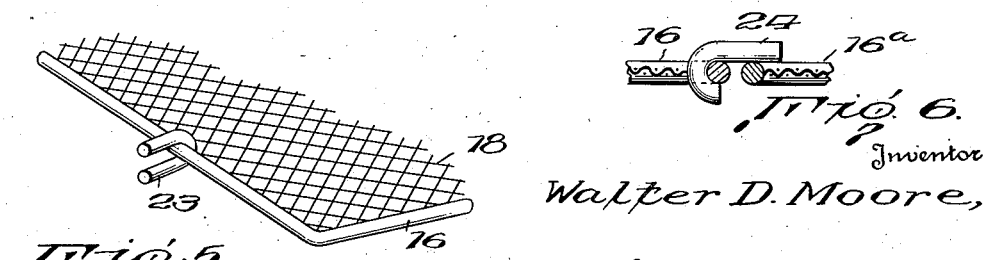
Inventor
Walter D. Moore,
By Church & Church
His Attorneys Patented June 9, 1936

2,043,858

UNITED STATES PATENT OFFICE 2,043,858

PROTECTOR COVER FOR TRUCKS

Walter D. Moore, Chattanooga, Tenn.

Application February 28, 1935, Serial No. 8,753

2 Claims. (Cl. 296—100)

This invention relates to improvements in vehicle bodies and particularly to bodies of the open top type used on trucks for delivery of commodities such as coal, coke and the like.

One object of the invention is to prevent the loss, either accidentally or by theft, of goods from an open top truck or vehicle body during transportation from vendor to purchaser.

A further object of the invention is to provide a vehicle or truck body of the open top type in which the goods of two purchasers can be placed for delivery to the respective purchasers but in which the two allotments of goods will be segregated and neither can be removed from the vehicle except under supervision of the purchaser. More specifically, the invention contemplates a delivery truck having an open top body divided into compartments by one or more removable partitions and screen like coverings for said compartments, said coverings each comprising sections hinged to the sides of the body and foldable over goods in the compartments in which position they are locked by key actuated means to prevent the goods being displaced accidentally or removed by theft. Preferably the removable partition divides the body into front and rear compartments and the edge of the covering for the front compartment extends over the partition so that the front covering when locked in closed position prevents removal of the partition Further, the sections of each covering are provided with means for interlocking the two sections together and the covering for the rear compartment is provided with projections which extend over the front cover sections.

With these and other objects in view, the invention consists in certain details of construction and combinations and arrangements of parts, all as will hereinafter be more fully described and the novel features thereof particularly pointed out in the appended claims.

In the accompanying drawings:

Fig. 3 is a rear view;

Fig. 4 is a transverse vertical section on line 4—4 of Fig. 2;

Fig. 5 is a detail perspective of the interlocking element for the two sections of each cover;

Fig. 6 is a detail sectional view on the line 6—6 of Fig. 1, illustrating the interlocking extension on the rear cover projecting over the front cover.

Figure 1:
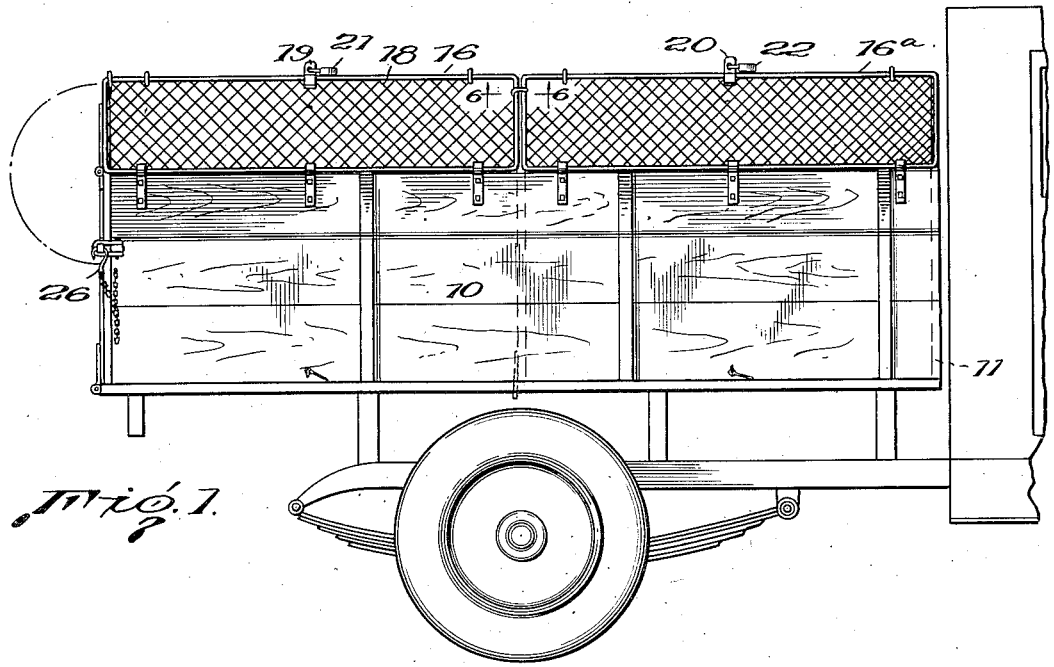
Figure 1 is a side elevation of a truck body with the present invention installed thereon, the compartment covers being closed.
Figure 2:
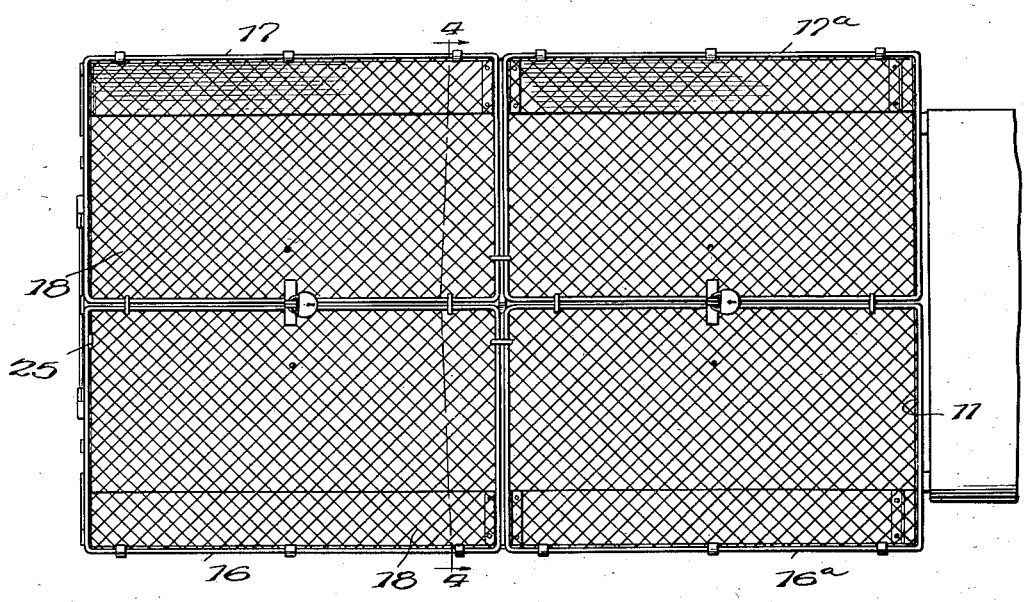
Fig. 2 is a top plan view.
Figure 7:
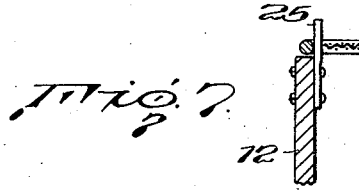
Fig. 7 is a detail view of the locking means for the tail gate or pivoted rear end wall of the body.

A portion only of the truck chassis is illustrated and mounted thereon in any suitable manner is the truck body comprising the side walls 10; front wall 11 and the rear wall composed of an upper section 12 pivoted on a lower section 13 which, in turn, is hinged on the bottom of the body.

Preferably, the interior of the body is divided into front and rear compartments by a partition 14 removable vertically from said body. The partition is positioned within the body by angle guides 15.

Each compartment is preferably provided with a separate top covering or protector and each covering is preferably formed of sections hinged to the side walls of the body. For instance, the rear compartment cover is composed of two frames 16, 17 pivoted to the sides 10 and each frame has a wire mesh material 18 secured therein so that when the frames are swung toward each other over the body they close the rear compartment and prevent displacement or removal of goods therefrom. Likewise, the front compartment is provided with a cover composed of frames 16a, 17a, and wire mesh 18, hinged to sides 10. The two sections of each cover are locked together in closed position to prevent unauthorized access thereto. As indicated sections 16, 17, are provided with hasps 19 and sections 16a, 17a, with hasps 20 and said covers are secured in closed position by key actuated locks 21, 22, engaging in said hasps. It is usual practice to place the goods of one purchaser in one compartment and those of a second purchaser in the other compartment. For this reason the locks 21 and 22 are controlled by different keys. This arrangement is preferred because in using the present invention on, say, coal delivery trucks, it is contemplated that the key for each compartment will be placed in a sealed envelope after the compartments are closed and said envelopes given to the truck driver who will deliver them to the respective purchasers who can either unlock the compartment containing their coal or can, at least, make an inspection before the compartment is unlocked.

To further lend rigidity to the several cover sections, when closed, one frame of each pair is provided with one or more bail-like members 23 in which the other frame of said pair is received, when swung to closing position. Also, the frames of the rear compartment cover are provided with extensions 24 adapted to project over the front compartment cover frames.

It will be observed that the several frames absolutely preclude access to the compartments when closed as they engage the upper extremities of all four sides of the body. It will also be observed that the rear edges of the front cover frames overlie the partition 14 so that the latter cannot be removed until the front cover is unlocked and opened. Likewise, the upper hinged section 12 of the rear wall or gate is provided with one or more locking fingers 25 adapted to project through the mesh material of the rear compartment cover sections when the latter are closed, thus requiring this cover to be unlocked and opened before the contents of the rear compartment can be removed. Of course, other auxiliary means such as hooks 26 may be used for taking the major portion of the stresses placed on the hinged rear wall when the latter is closed.

As before intimated, the preferred embodiment of the invention is especially adapted for use in delivery trucks for coal, coke, etc. The coal purchases of two customers can be placed in the two compartments and the covers closed and locked. The keys are then sealed in envelopes and turned over to the truck driver. Upon arriving at the destination of the coal in the rear compartment, the driver delivers the envelope containing the key for said compartment to that customer who may either break the seal of the envelope and unlock the cover or may permit the driver to do so after making an inspection of the contents of the compartment. In either case, the customer can be assured that the contents of the compartment have remained intact before accepting the same. After the contents of the rear compartment are discharged, the contents of the front compartment are delivered with the same procedure. Both purchasers are thus assured that they have received full measure.

What I claim is:

1. The combination of an open top vehicle body, a removable rear end wall, a removable partition dividing said body into front and rear compartments, a pair of rectangular frames for each compartment pivoted to opposite sides of the body, mesh material on said frames adapted to form top closures for said compartments when the frames are swung inwardly over said body, the rear ends of the frames for the rear compartment overlying the removable rear wall when in closed position, and the rear ends of the front compartment frames overlying the removable partition, interlocking elements connecting the frames of each compartment, members on the rear compartment frames overlying the rear ends of the front compartment frames, and separate locking means for locking together the two frames of each compartment.

2. The combination of an open top vehicle body having a removable rear end wall and a removable partition dividing said body into front and rear compartments, the upper portion of said rear wall being pivotally connected to the lower portion thereof, a pair of frames for each compartment pivoted to the side walls of the body, mesh material on said frames adapted to form top closures for said compartments when the frames are swung inwardly over said body, a projection on the pivoted section of the rear wall extending through the mesh of one of the rear compartment covers, whereby said pivoted section is held against movement by said cover, and separate key-controlled locking devices for the covers of said compartments.

WALTER D. MOORE.